US010227129B2

(12) United States Patent
Fisher et al.

(10) Patent No.: US 10,227,129 B2
(45) Date of Patent: *Mar. 12, 2019

(54) AIRCRAFT SYSTEM FOR REDUCED OBSERVER VISIBILITY

(71) Applicant: AeroVironment, Inc., Monrovia, CA (US)

(72) Inventors: Christopher Eugene Fisher, Thousand Oaks, CA (US); Steven Bradley Chambers, Simi Valley, CA (US); Pavil Belik, Simi Valley, CA (US); Austin Craig Gunder, Red Lion, PA (US); John Peter Zwaan, Simi Valley, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,467

(22) Filed: Jan. 12, 2018

(65) Prior Publication Data

US 2018/0222570 A1    Aug. 9, 2018

Related U.S. Application Data

(63) Continuation of application No. 14/184,542, filed on Feb. 19, 2014, now Pat. No. 9,902,489, which is a
(Continued)

(51) Int. Cl.
*B64C 5/02*   (2006.01)
*B64C 39/02*   (2006.01)
(Continued)

(52) U.S. Cl.
CPC ............. *B64C 5/02* (2013.01); *B64C 3/10* (2013.01); *B64C 5/06* (2013.01); *B64C 9/00* (2013.01);
(Continued)

(58) Field of Classification Search
CPC .......... B64C 2201/021; B64C 2201/22; B64C 39/00; B64C 39/024; B64C 39/12;
(Continued)

(56) References Cited

U.S. PATENT DOCUMENTS 1,400,735 A * 12/1921 Eddy ................... A63H 27/08
                                                    244/154
1,839,194 A *  1/1932 Blondin ................ B64C 39/00
                                                    244/113
(Continued)

OTHER PUBLICATIONS

Final Office action for U.S. Appl. No. 14/184,542 dated Feb. 16, 2017.
(Continued)

*Primary Examiner* — Medhat Badawi
(74) *Attorney, Agent, or Firm* — Brooks Acordia IP Law, PC; Pejman Yedidsion; Eric Aagaard

(57) ABSTRACT

An aircraft apparatus is disclosed that has a fuselage boom having proximal and distal ends, a wing coupled to a proximal end of the fuselage boom and at least one transparent stabilizer coupled to a distal end of the fuselage boom.

20 Claims, 13 Drawing Sheets

Related U.S. Application Data continuation of application No. PCT/US2012/051176, filed on Aug. 16, 2012.

(60) Provisional application No. 61/525,655, filed on Aug. 19, 2011.

(51) Int. Cl.
   *B64C 3/10* (2006.01)
   *B64C 5/06* (2006.01)
   *B64C 9/00* (2006.01)
   *B64C 39/00* (2006.01)
   *B64C 39/12* (2006.01)

(52) U.S. Cl.
   CPC ............ *B64C 39/00* (2013.01); *B64C 39/024* (2013.01); *B64C 39/12* (2013.01); *B64C 2201/021* (2013.01); *B64C 2201/22* (2013.01)

(58) Field of Classification Search
   CPC .... B64C 3/10; B64C 5/02; B64C 5/06; B64C 9/00; G06F 3/0421; A63H 27/00; A63H 27/18; A63H 27/02; A63H 27/66; Y02T 50/12
   See application file for complete search history.

(56) References Cited

U.S. PATENT DOCUMENTS

| | | | | |
|---|---|---|---|---|
| 2,143,541 A * | 1/1939 | Caprine | ............... | A63H 27/001 446/67 |
| 2,154,487 A * | 4/1939 | Bonnell | ............... | A63H 27/001 446/67 |
| 2,294,367 A * | 9/1942 | Fleming | ................. | B64C 39/10 244/218 |
| 2,423,090 A * | 7/1947 | Fink | ..................... | F42B 15/105 102/384 |
| 2,454,598 A * | 11/1948 | Doyle | .................... | A63H 27/02 446/66 |
| 2,539,357 A * | 1/1951 | Wald | ......................... | B64C 5/08 244/13 |
| 2,559,823 A * | 7/1951 | Klose | ........................ | B64C 5/08 244/113 |
| 2,562,490 A * | 7/1951 | Hall | ......................... | B64C 37/00 244/118.2 |
| 2,565,990 A * | 8/1951 | Gilbert | ...................... | B64C 5/08 244/199.4 |
| 2,573,271 A * | 10/1951 | Perl | ........................ | B64C 37/00 244/2 |
| 2,577,287 A * | 12/1951 | Suliivan | ................. | B64C 39/02 244/102 R |
| 2,595,363 A * | 5/1952 | Lee | ............................ | B64C 5/08 244/13 |
| 2,674,422 A * | 4/1954 | Pellarini | .................. | B60F 5/02 244/49 |
| 2,870,567 A * | 1/1959 | Bergstrand | ............. | A63H 27/02 244/117 R |
| 3,065,799 A * | 11/1962 | McCarty, Jr. | ........... | B64C 27/16 244/123.1 |
| 3,169,937 A * | 2/1965 | Yashiro | .................... | C08K 3/24 106/14.39 |
| 3,574,481 A * | 4/1971 | Pyne, Jr. | ................. | F01D 5/189 416/90 R |
| 3,576,086 A * | 4/1971 | Halsey | ................... | A63H 27/001 446/68 |
| 3,995,393 A * | 12/1976 | Patterson | ............... | A63H 27/00 446/66 |
| 4,281,810 A * | 8/1981 | Poisson-Quinton | ...... | B64C 5/16 244/45 A |
| 4,535,958 A * | 8/1985 | Hutchison | ................ | B64C 3/18 244/123.8 |
| 4,553,818 A * | 11/1985 | Cohen | ..................... | G02B 5/00 359/613 |
| 5,035,382 A * | 7/1991 | Lissaman | ............... | A63H 27/00 244/120 |
| 5,076,516 A * | 12/1991 | Wheat | ...................... | B64C 3/14 244/154 |
| 5,395,073 A * | 3/1995 | Rutan | ...................... | B64C 3/385 244/38 |
| 5,941,478 A * | 8/1999 | Schmittle | .................. | B64C 1/00 244/120 |
| 5,979,824 A * | 11/1999 | Gagliano | .................. | B64C 1/26 244/13 |
| 6,142,421 A * | 11/2000 | Palmer | .................. | B64C 39/024 220/4.13 |
| 6,327,994 B1 * | 12/2001 | Labrador | ............... | B01D 61/10 114/382 |
| 6,336,838 B1 * | 1/2002 | Levy | ...................... | A63H 27/14 446/34 |
| 6,367,738 B1 * | 4/2002 | Wadleigh | ................ | B64C 39/04 244/13 |
| 6,497,600 B1 * | 12/2002 | Levy | ...................... | A63H 27/00 446/34 |
| 6,612,893 B2 * | 9/2003 | Rehkemper | ............ | A63H 27/02 446/34 |
| 6,726,148 B2 * | 4/2004 | Carroll | .................. | B64C 39/024 206/335 |
| 6,840,480 B2 * | 1/2005 | Carroll | .................. | B64C 39/024 244/117 R |
| 6,910,278 B2 * | 6/2005 | Holder | .................... | B23P 6/002 33/530 |
| 6,942,180 B2 * | 9/2005 | McVaugh | ................. | B64F 1/22 180/19.2 |
| 7,262,601 B2 * | 8/2007 | Dransfield | ............. | G01V 3/165 324/331 |
| 7,313,962 B1 * | 1/2008 | O'Neil | ..................... | G01C 5/06 73/700 |
| 7,581,696 B2 * | 9/2009 | Morgan | ................... | B64C 5/02 244/45 R |
| 7,699,261 B2 * | 4/2010 | Colten | ................... | B64C 39/024 244/45 R |
| 8,038,093 B2 * | 10/2011 | Llamas Sandin | ......... | B64C 9/02 244/87 |
| 8,070,090 B2 * | 12/2011 | Tayman | ................... | B64C 27/24 244/6 |
| 8,123,162 B2 * | 2/2012 | Sirkis | ..................... | B64C 39/024 244/100 A |
| 8,128,032 B2 * | 3/2012 | Pajard | ...................... | B64C 3/56 244/124 |
| 8,133,089 B2 * | 3/2012 | Amireh | .................. | A63H 29/22 446/57 |
| 8,140,200 B2 * | 3/2012 | Heppe | .................... | B64C 39/024 701/16 |
| 8,235,327 B2 * | 8/2012 | Jackson | ................. | A63H 27/02 244/190 |
| 8,336,809 B2 * | 12/2012 | Muren | ................. | A63H 27/008 244/22 |
| 8,356,770 B2 * | 1/2013 | Parks | ...................... | B64D 27/24 244/87 |
| 8,371,520 B2 * | 2/2013 | Easter | ...................... | B60F 5/02 244/2 |
| 8,562,552 B1 * | 10/2013 | Marble | ............... | A61F 5/05841 602/32 |
| 8,579,226 B2 * | 11/2013 | Deale | ...................... | A63H 27/02 244/12.4 |
| 8,780,361 B2 * | 7/2014 | Ashford | ................ | G01B 11/2504 356/121 |
| 8,939,810 B1 * | 1/2015 | Suknanan | ............... | A63H 27/02 446/34 |
| 9,902,489 B2 * | 2/2018 | Fisher | ................... | B64C 39/024 |
| 2002/0093564 A1 * | 7/2002 | Israel | ................... | H04N 7/106 348/145 |
| 2003/0060943 A1 * | 3/2003 | Carroll | ................... | B64C 39/024 701/3 |
| 2005/0233672 A1 * | 10/2005 | Shantz | ................. | A63H 27/001 446/232 |
| 2005/0258310 A1 * | 11/2005 | Bilyk | ..................... | B63B 22/003 244/138 R |

(56) References Cited

U.S. PATENT DOCUMENTS

| | | | | |
|---|---|---|---|---|
| 2006/0091258 | A1* | 5/2006 | Chiu | A45C 13/02 244/119 |
| 2006/0292957 | A1* | 12/2006 | Howard | A63H 27/001 446/61 |
| 2007/0018049 | A1* | 1/2007 | Stuhr | B64C 23/069 244/124 |
| 2007/0228342 | A1* | 10/2007 | Bumann | C08J 3/226 252/601 |
| 2008/0023585 | A1* | 1/2008 | Kordel | B64C 3/00 244/123.5 |
| 2008/0290691 | A1* | 11/2008 | Corsiglia | A63H 27/001 296/181.2 |
| 2009/0224108 | A1* | 9/2009 | Lutke | B64C 3/46 244/219 |
| 2010/0013236 | A1* | 1/2010 | Carroll | B64C 39/022 290/55 |
| 2010/0025543 | A1* | 2/2010 | Kinsey | B64C 29/02 244/7 A |
| 2010/0181432 | A1* | 7/2010 | Gratzer | B64C 11/18 244/199.4 |
| 2010/0194142 | A1* | 8/2010 | Seifert | F15D 1/12 296/180.1 |
| 2010/0270417 | A1* | 10/2010 | Goldshteyn | B64C 37/00 244/2 |
| 2010/0282897 | A1* | 11/2010 | de la Torre | B64C 39/024 244/49 |
| 2011/0260462 | A1* | 10/2011 | Vander Lind | A63H 27/002 290/55 |
| 2012/0312928 | A1* | 12/2012 | Gratzer | B64C 23/069 244/199.4 |
| 2014/0312169 | A1* | 10/2014 | Fisher | B64C 39/024 244/89 |
| 2014/0343752 | A1* | 11/2014 | Fisher | B64C 39/024 701/2 |
| 2014/0346281 | A1* | 11/2014 | Gratzer | B64C 23/069 244/199.4 |
| 2014/0350748 | A1* | 11/2014 | Fisher | B64C 39/024 701/2 |

OTHER PUBLICATIONS

International Search Report for PCT Serial No. PCT/US12/51176 dated May 6, 2013.
Non-Final Office action for U.S. Appl. No. 14/184,542 dated Sep. 16, 2016.
Notice of Allowance for U.S. Appl. No. 14/184,542 dated Oct. 16, 2017.
Restriction Requirement for U.S. Appl. No. 14/184,542 dated Apr. 27, 2016.
TSP DURAVUE 7000 Fact Sheet durable Anti-Reflection Optical Thin Film Coatings, Retrieved from the Internet on Sep. 11, 2016, URL.

* cited by examiner

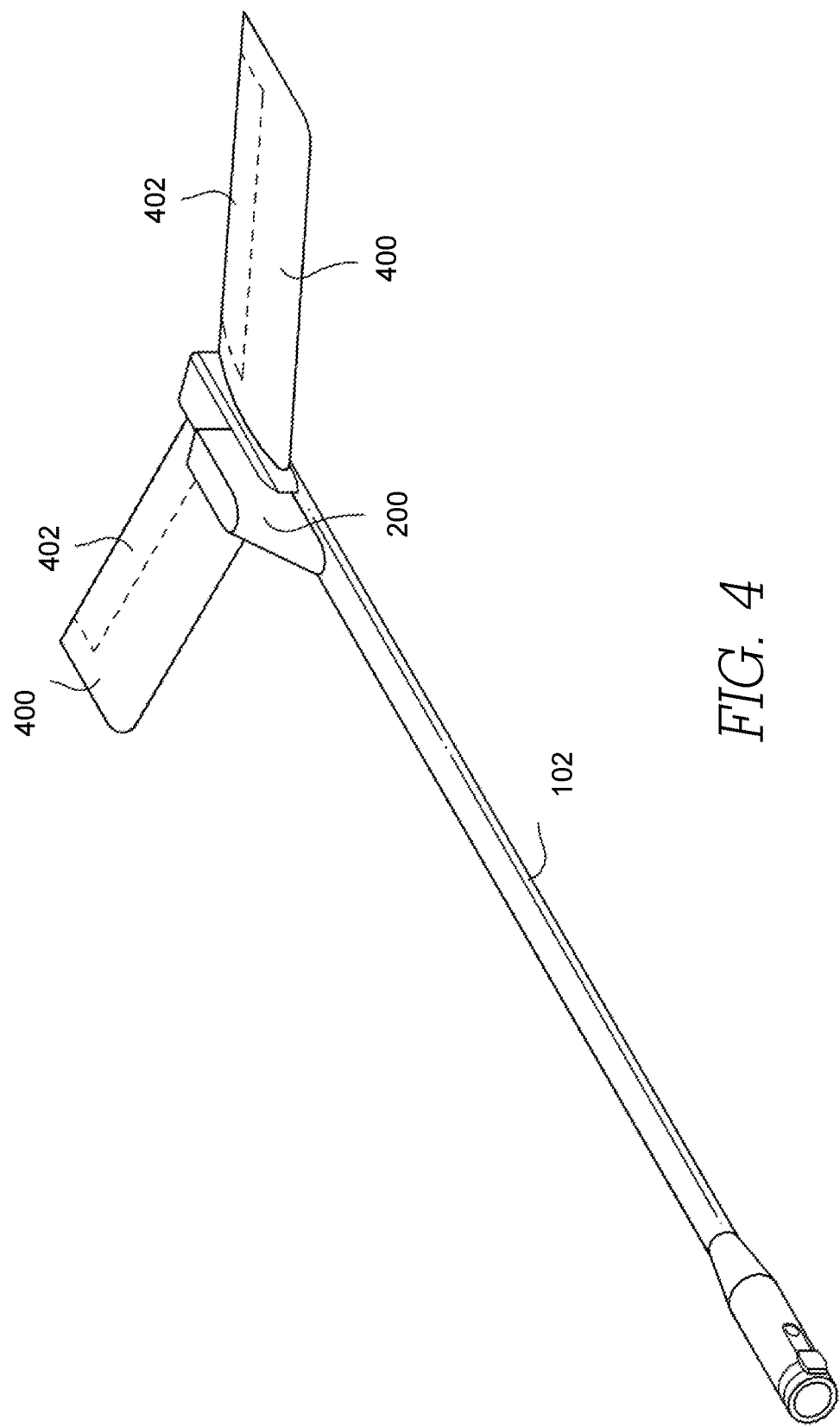

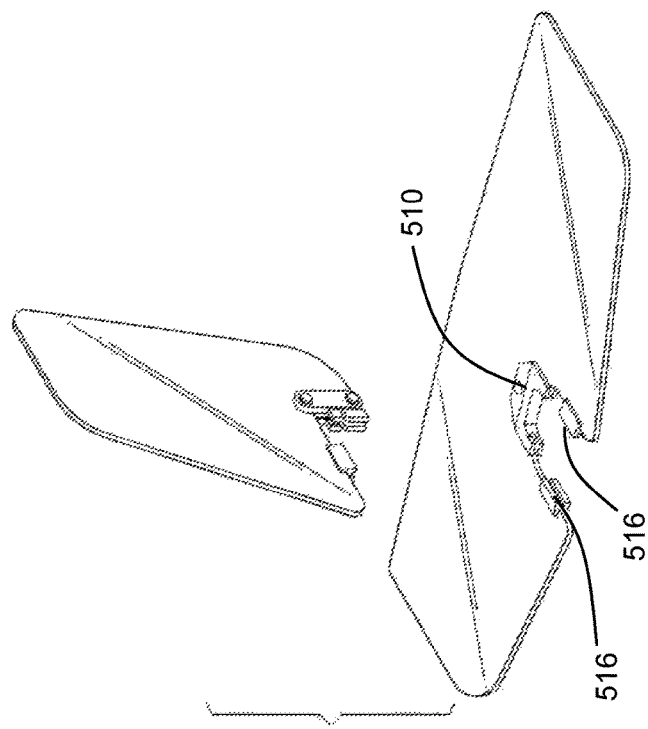
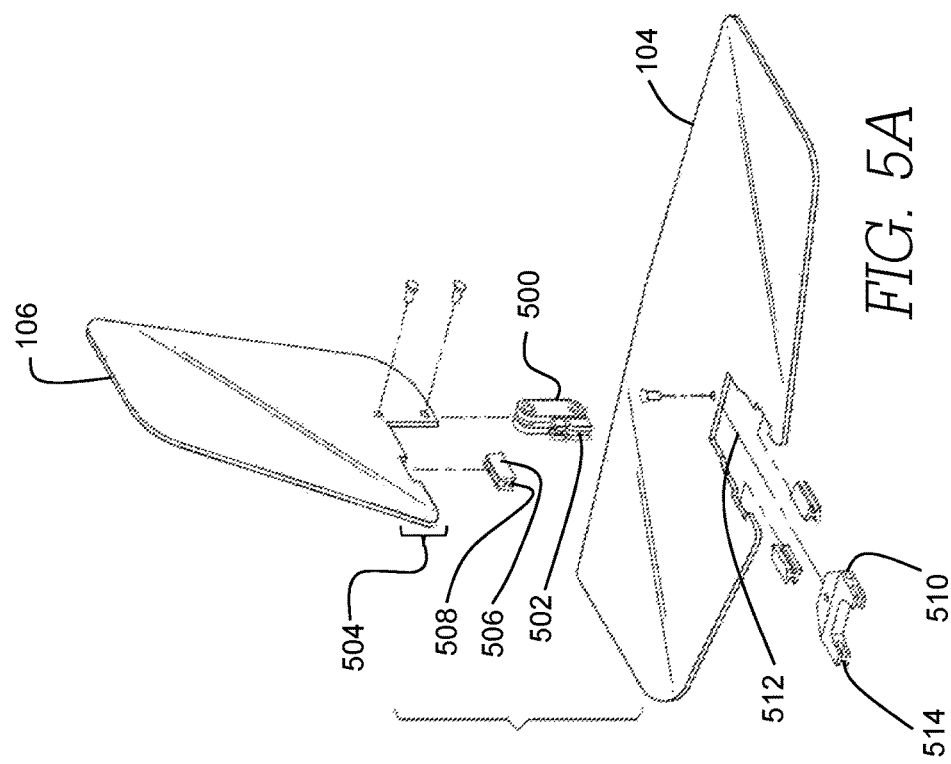

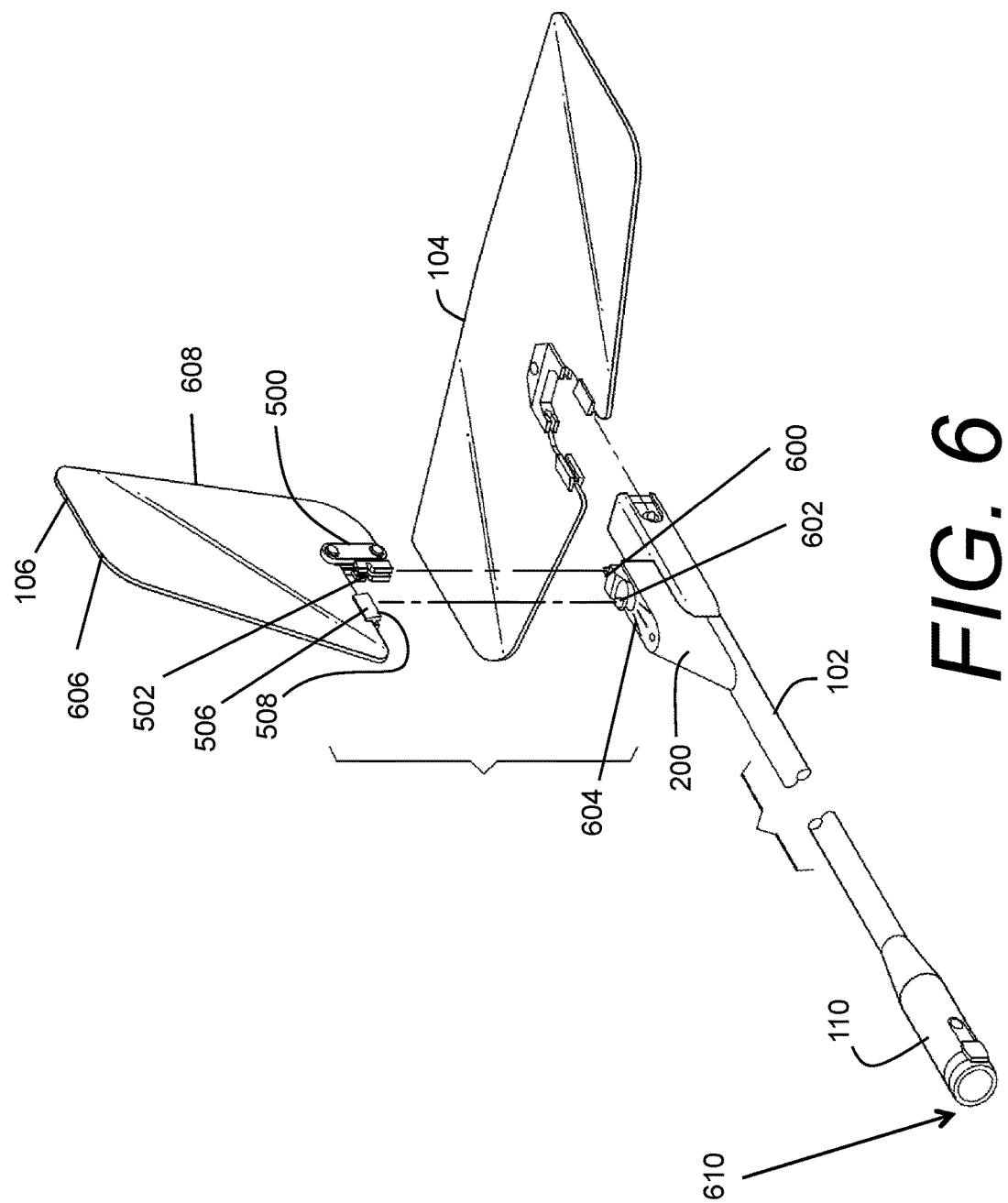

AIRCRAFT SYSTEM FOR REDUCED OBSERVER VISIBILITY

CROSS REFERENCE TO RELATED APPLICATIONS

This application is a continuation of U.S. patent application Ser. No. 14/184,542 filed Feb. 19, 2014, which is a continuation of International Patent Application No. PCT/US12/51176, filed Aug. 16, 2012, which claims priority to and the benefit of U.S. Provisional Patent Application Ser. No. 61/525,655 filed Aug. 19, 2011, all of which are hereby incorporated by reference in their entirety for all purposes.

TECHNICAL FIELD

The field of the invention relates to aircraft, and more particularly to stabilizers for unmanned aerial vehicles (UAVs).

BACKGROUND

Unmanned aerial vehicles (UAVs) may be used to provide remote observation of a location of interest, such as monitoring of a pipeline and other high-value ground assets, finding those who are lost and in distress, or monitoring other remote observation locations not immediately available to observers on the ground. At times, such monitoring must be done without knowledge of those in the observation area.

A need continues to exist for a UAV that can monitor a location of interest while reducing the likelihood that those in the observation area see such monitoring.

SUMMARY

An aircraft system is disclosed that includes a fuselage boom having proximal and distal ends, a wing coupled to the proximal end, and a transparent stabilizer coupled to the distal end that collectively reduces the likelihood of the aircraft system being seen by those in an observation area. In all embodiments described herein, the transparent stabilizer, whether in the form of a horizontal stabilizer, vertical stabilizer, vertical fin, ruddervator, or canard, may be made from a clear thermoplastic polymer that is highly transparent to visible light such as clear polycarbonate plastic, clear polymethyl methacrylate or other substantially transparent material. In some embodiments, the first transparent stabilizer is either a vertical fin or a ruddervator. The aircraft system may also include a servo housed in the distal end of the fuselage boom, the servo having a servo arm, and a servo horn slidably coupled to the first transparent stabilizer to slidably receive and detachably couple the servo arm to the first transparent stabilizer. The wing may have a center section and port and starboard outboard wing sections, each of the port and starboard outboard wing sections detachably connectable to the center section and each of the outboard sections having curved leading and trailing edges of varying radii. The first transparent stabilizer may form a flat plate airfoil. The aircraft system may also include a servo housed in the distal end of the fuselage boom to drive the first transparent stabilizer and may include a plurality of calibration lines marked on an exterior surface of the distal end of the fuselage boom, and adjacent to, the first transparent stabilizer to provide calibration marks for the first transparent stabilizer. A memory may be housed in the proximal end of the fuselage boom to store calibration information. Possible implementations of the first transparent stabilizer may include a horizontal stabilizer and/or a horizontal stabilizer that is a canard.

An exemplary embodiment of an aircraft system may have a wing, a tubular boom extending from the wing, and a first clear stabilizer coupled to the tubular boom. A center section of the wing may have a fuselage compartment. The wing may also form a center section, an outboard port section and outboard starboard section, with the outboard port and outboard starboard portions each having leading and trailing edges defining non-linear lines. In embodiments where the first clear stabilizer is an elevator, the aircraft system may also have a clear vertical stabilizer positioned adjacent the elevator. In addition, a rigid pin may extend from the tubular boom and also include an attachment clip coupled to the clear vertical stabilizer, the attachment clip having a channel to receive the rigid pin so that the clear vertical stabilizer is rotatable about the rigid pin. In such an embodiment, the clear vertical stabilizer may be a flat plate airfoil. If the first clear stabilizer is a vertical stabilizer, the system may further have a clear elevator and/or the tubular boom may have a distal end having calibration marks disposed underneath a rotational travel path of the vertical stabilizer to assist the calibration of trim for the vertical stabilizer. In one implementation of the clear stabilizer that is a vertical stabilizer, the vertical stabilizer has a flat plate airfoil. Also, in embodiments where the first clear stabilizer is a vertical stabilizer, the aircraft system may include a metal pin extending from the tubular boom and an attachment clip coupled to the clear vertical stabilizer, the attachment clip having a channel to receive the metal pin so that the clear vertical stabilizer is rotatable about the metal pin. The aircraft system may include a metal pin extending from the tubular boom and an attachment clip coupled to the clear polycarbonate vertical stabilizer, the attachment clip having a channel to receive the metal pin.

Another exemplary embodiment of an aircraft system has a wing, a fuselage boom extending from the wing, and stabilizer means coupled to the fuselage boom for providing transparent aircraft tail stabilization. The stabilizer means may be an elevator of clear rigid plastic. The aircraft system may have a clear vertical stabilizer positioned adjacent the elevator, and may also have a rigid pin extending from the fuselage boom and an attachment clip coupled to the clear vertical stabilizer, the attachment clip having receiving means to receive the rigid pin so the clear vertical stabilizer is rotatable about the rigid pin.

An exemplary method of unmanned aerial vehicle (UAV) assembly which may include rotating a transparent vertical stabilizer about a rigid pin to detachably couple the transparent vertical stabilizer to a first servo arm extending from a fuselage boom, rotating a transparent horizontal stabilizer about a hinge to detachably couple the transparent vertical stabilizer to a second servo arm extending from the fuselage boom and coupling the fuselage boom, to a wing center section. The method may also include retrieving vertical stabilizer calibration information from a memory in the fuselage boom. The method may also include trimming said vertical stabilizer by visually comparing trim marks on an exterior surface of said fuselage boom with a leading edge of said vertical stabilizer. In one embodiment, the method may also include detachably coupling a center section boom clip fixed to said wing center section to an attachment clip fixed to said fuselage boom so that said fuselage boom is detachably coupled to said wing center section.

BRIEF DESCRIPTION OF THE DRAWINGS

Embodiments of the invention are illustrated by way of example and not limitation in the figures of the accompanying drawings, and in which:

FIG. 4 is an enlarged perspective view of the fuselage boom of FIG. 1, that illustrates another embodiment for a transparent stabilizer;

FIGS. 5A and 5B are exploded perspective views of assembly steps for a transparent vertical fin and horizontal stabilizer;

FIG. 6 is an enlarged perspective view illustrating an assembly of a transparent vertical fin and transparent horizontal stabilizer onto the fuselage boom first illustrated in FIG. 1;

DETAILED DESCRIPTION

An aircraft system is disclosed that includes a fuselage boom having proximal and distal ends, a wing coupled to the proximal end, and a transparent stabilizer coupled to the distal end that collectively reduce the likelihood of the aircraft system being seen by those in an observation area.

Figure 1:
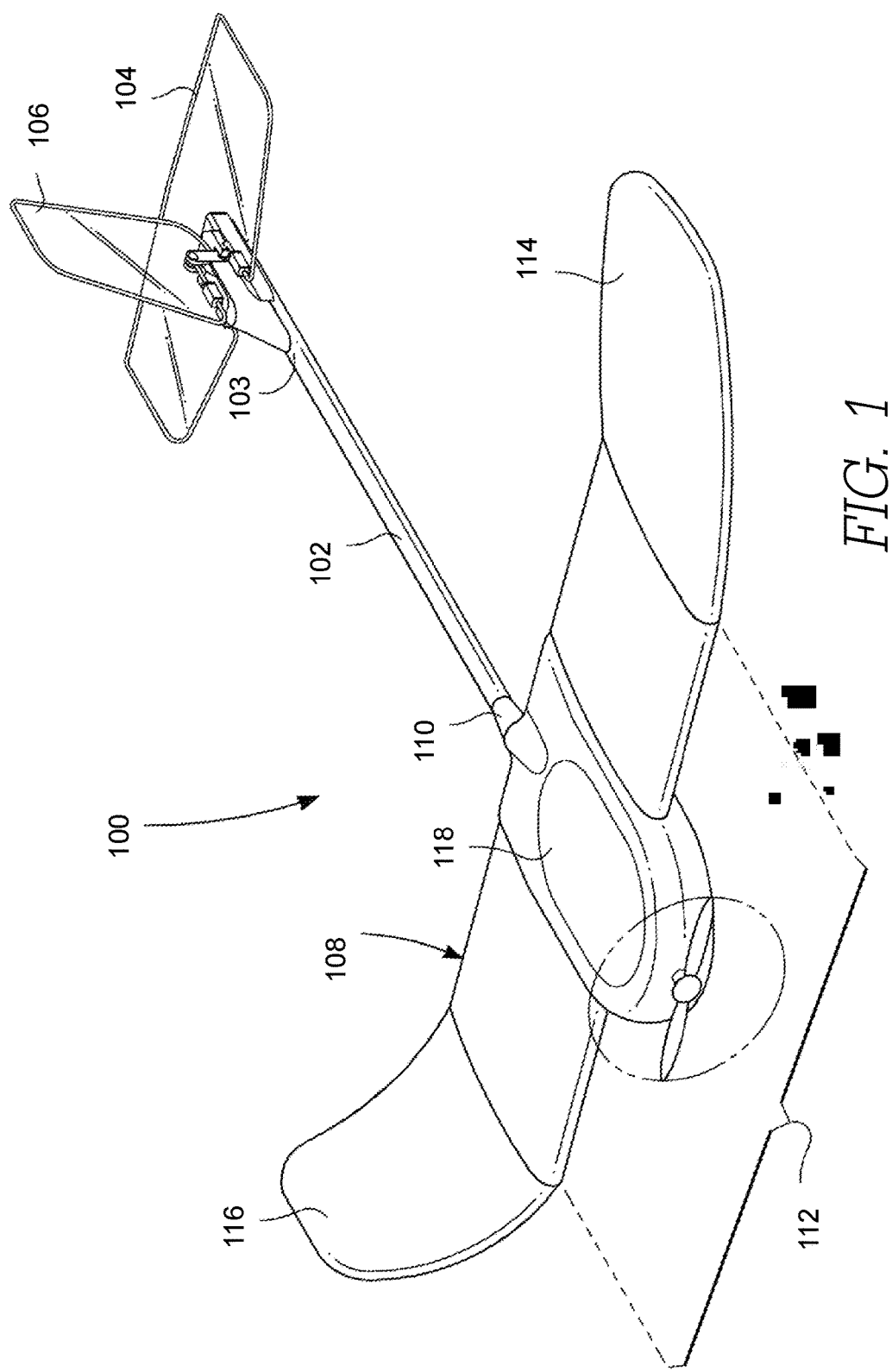
FIG. 1 is a perspective view of an embodiment of an aircraft system having a wing coupled to a proximal end of a fuselage boom and a transparent stabilizer coupled to a distal end of the fuselage boom.

FIG. 1 illustrates one embodiment of an aircraft system 100 having a transparent stabilizer coupled to a wing through a fuselage boom 102. The fuselage boom 102 may be tubular and may have a diameter that is sufficiently small to make ground observation of the tail rod difficult while the aircraft system is at altitude. A transparent stabilizer is coupled to a distal end 103 of the fuselage boom 102. The transparent stabilizer may be a transparent horizontal stabilizer 104 and transparent vertical fin 106. A proximal end 110 of the fuselage boom 102 may be detachably coupled to and extend from a wing 108. The wing 108 may be defined by a center section 112, a port outboard wing section 114 and a starboard outboard wing section 116 where port and starboard have curved leading and trailing edges of varying radii from what may otherwise be a typical linear aircraft sweep line to reduce the likelihood that the aircraft system may be seen by those in an observation area during flight. The curved leading and trailing edges may give the wing 108 a more organic look than would otherwise exist with a typical wing configuration to more closely mimic a flying animal such as a hawk, eagle, seagull or other bird as observed by a ground observer while the aircraft system is at altitude. Each of the starboard outboard wing section 116 and port outboard wing section 114 may be formed having a transparent covering material or may be formed of transparent materials. Each of the port outboard wing section 114 and starboard outboard wing section 116 may be detachably connectable to the center section 112, such as with a pin and ball arrangement (see FIGS. 11A, 11B, and 12), to facilitate portability of the aircraft. The center section 112 also may have a fuselage compartment 118 to provide space for control electronics, and communication and sensor electronics. In the embodiment illustrated in FIG. 1, the aircraft employs a typical puller—propeller arrangement to define a tail plane.

The transparent vertical fin 106 and transparent horizontal stabilizer 104 preferably have flat-plate airfoil cross sections and may be formed from a clear rigid plastic such as polycarbonate plastic to reduce visibility of the fin and stabilizer from the ground. In all embodiments described herein, the transparent stabilizer, whether in the form of a horizontal stabilizer, vertical stabilizer, vertical fin, ruddervator, elevator, canard, or similar control surface, may be made from a clear thermoplastic polymer that is highly transparent to visible light such as clear polycarbonate plastic, clear polymethyl methacrylate or other substantially transparent and strong material suitable for use as a control surface of a UAV. Instead of having a flat-plate airfoil, one or more of the stabilizers (106, 104) may be formed from a non-flat plate airfoil such as a symmetrical airfoil, flat bottom airfoil or a semi-symmetrical airfoil. In addition to the airfoil shapes, the shape, including the cross-sectional configuration of the transparent, or substantially transparent, control surface may be formed to minimize, or significantly reduce, the likelihood of reflecting or otherwise directing sunlight (or another source of illumination) to a ground observer. For example, the cross-section of the control surface may be a concave (such as cambered) or convex shape to focus or defuse the light (See FIGS. 13A and 13B). The horizontal stabilizer 104 may be approximately rectangular; with the transparent vertical fin 106 formed in a polygonal shape. The use of a flat plate airfoil and generally angular features of the horizontal stabilizer 104 and vertical fin 106 may serve to reduce reflection of the sun off the transparent stabilizer (104, 106) and may reduce the aircraft's visibility to a ground observer. For example, reflection of the sun off of a curved surface may result in many ground locations receiving the reflected light. Use of a flat surface may minimize reflection of the sun to a single ground location. A non-reflective coating may also be applied to the transparent stabilizer, such as TSP DURA-VUE® 7000 offered by TSP, Inc. of Batvia, Ohio. A transparent stabilizer, whether in the form of a horizontal stabilizer, vertical stabilizer, vertical fin, ruddervator, canard or the like, is intended herein to mean at least a stabilizer without substantially visible internal structural support such as would be utilized in standard internal frame construction techniques.

In some embodiments, the aircraft system 100 may have one or more illuminating devices (not shown) to make the aircraft system 100 more visible. For example, these illuminating devices may be used in night operations where it is advantageous to see the aircraft system 100. These illuminating devices may include an adjacent light source, for example, a light-emitting diode (LED), which reflects off of a transparent portion of the aircraft system not having an anti-reflective coating and/or by aligning a light source with an edge of a transparent portion of the aircraft system 100, whereby the center of the transparent portion, the edge of the transparent portion, or both the center and the edge of the transparent portion are illuminated. In some exemplary embodiments, the aircraft system 100 may be illuminated in an aircraft navigation arrangement. For example, a green light on starboard, a red light on port side, and a white light on the tail.

Figure 2:
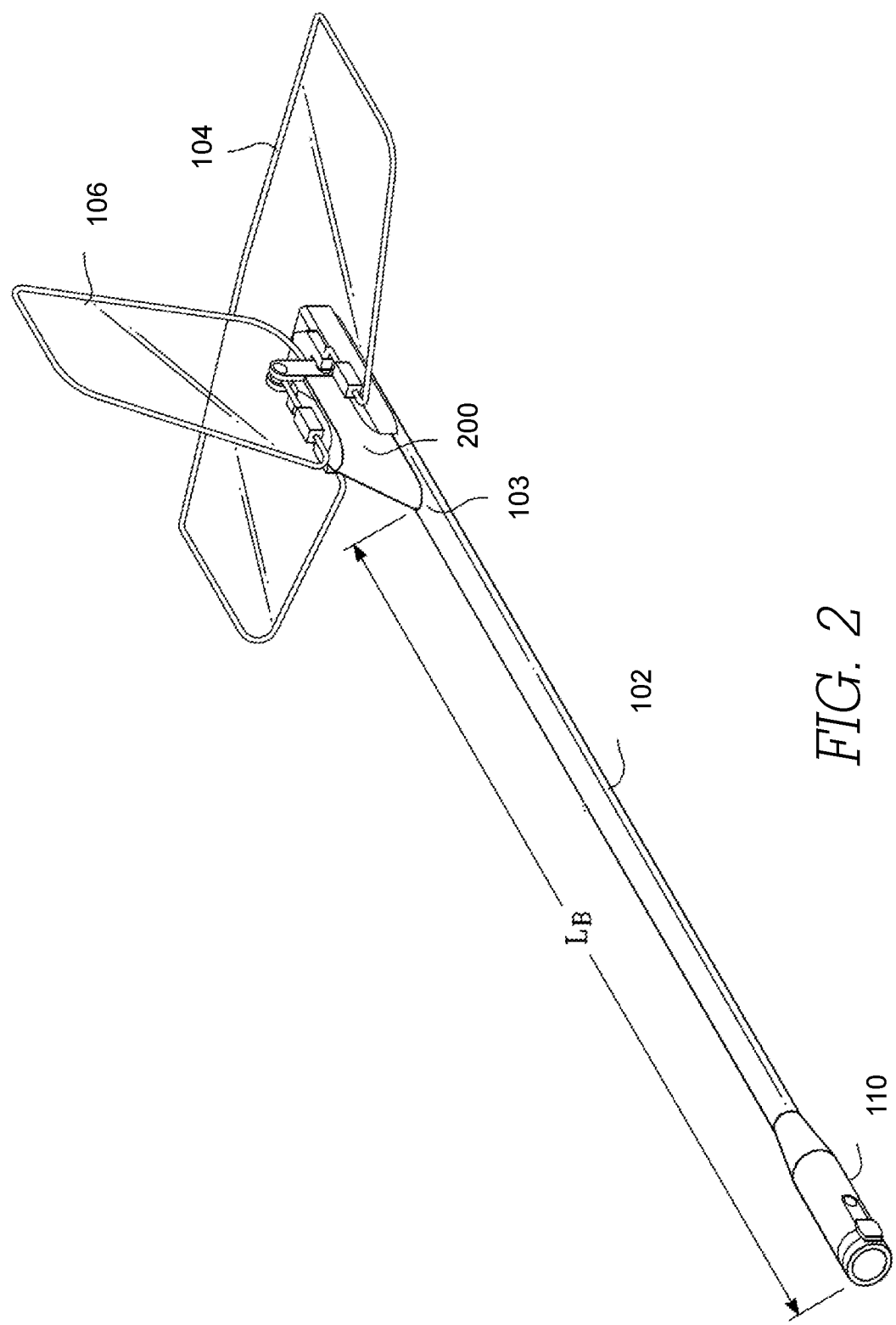
FIG. 2 is an enlarged perspective view of the fuselage boom and transparent stabilizer of FIG. 1.

FIG. 2 is a perspective view of the fuselage boom 102 and transparent stabilizer (104, 106) illustrated in FIG. 1. The fuselage boom 102 may be tubular having an outer diameter of approximately 25 mm and a length $L_B$ of approximately 0.25 to 2 m to reduce the visibility of the fuselage boom 102 during flight, and may be formed of a composite material such as carbon fiber, fiberglass or any other lightweight and rigid material suitable for aircraft structural design constraints. The fuselage boom 102 may have a non-tubular cross-section, such as an oval, square, or rectangular cross section. The oval or rectangular non-tubular cross-section may be oriented such that the narrow portion of the cross-section is substantially vertical so as to further reduce visibility to an observer located on the ground. The transparent horizontal stabilizer 104 and transparent vertical fin 106 may be each preferably rotatably coupled to the fuselage boom at its distal end 103 to form full-flying stabilizers. Additionally, each may employ fixed and rotatable stabilizer portions (not shown) to accomplish control of the aircraft. The proximal end 110 of the fuselage boom 102 may have an enlarged portion to allow internal space for memory and alignment electronics to store calibration information for trim for either or both of the transparent stabilizers (104, 106). This may allow for storage of calibration information for the fuselage boom 102 and transparent stabilizers (104, 106) themselves to enable use and interchangeability between aircraft. Such an internal space for memory and alignment electronics would allow calibration information to be transmitted to any applicable aircraft capable of utilizing the boom and stabilizer. A servo compartment 200 may also be formed at the distal end 103 to allow space for one or more direct-drive servos (not shown) to drive the rotatable stabilizers (104, 106).

Figure 3:
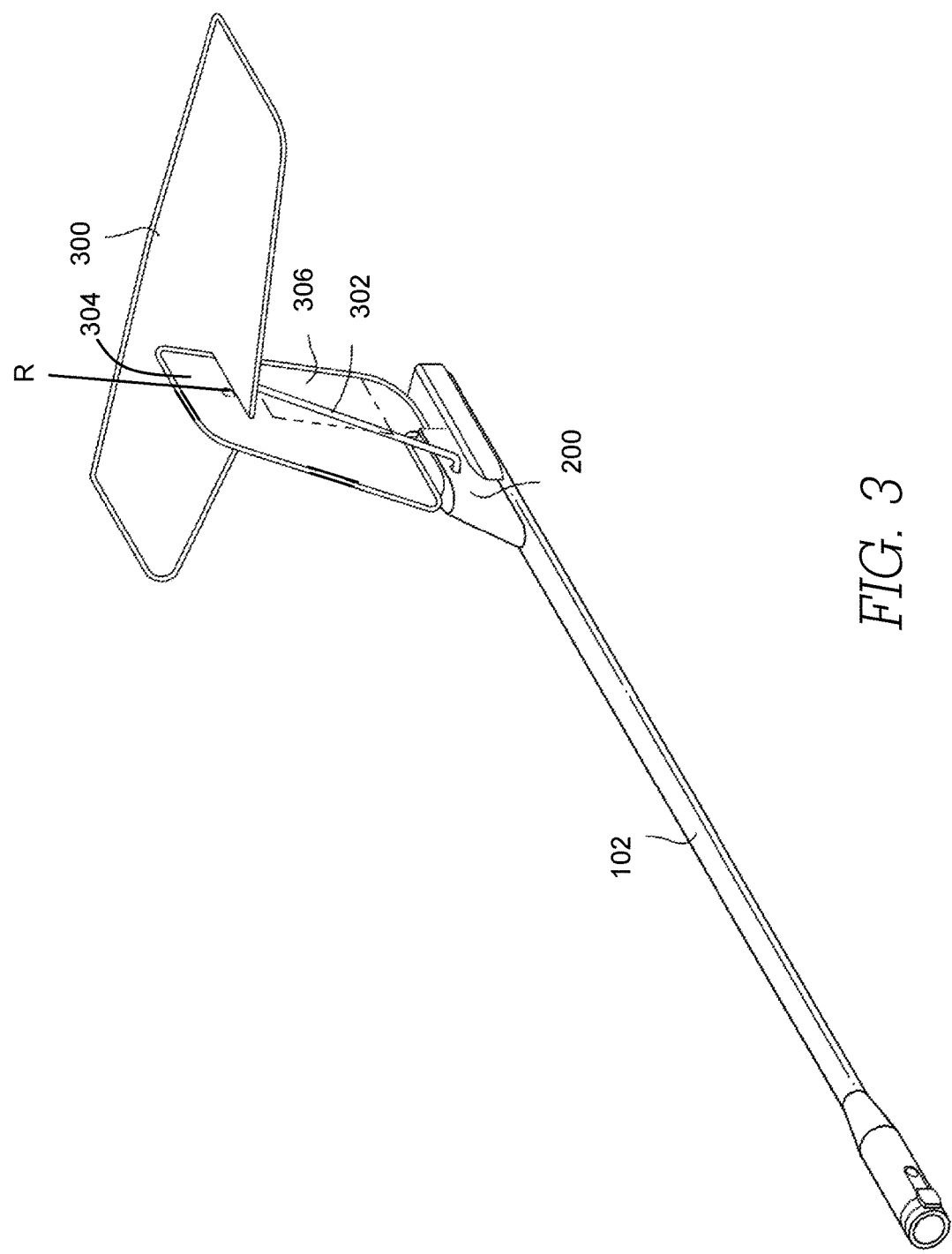
FIG. 3 is an enlarged perspective view of the fuselage boom of FIG. 1 that illustrates an alternative embodiment for a transparent stabilizer.

FIG. 3 is a perspective view of the fuselage boom 102 illustrated in FIG. 1, but having a modified horizontal stabilizer 300 to define a T-tail type transparent stabilizer. The fuselage boom 102 may have a pushrod 302 extending from the servo compartment 200 to rotatably drive the transparent horizontal stabilizer 300 about point R on the transparent vertical fin 304. The transparent horizontal stabilizer 300 may have a flat-plate airfoil as described for FIGS. 1 and 2 to reduce the reflection of the sun off of the transparent horizontal stabilizer 300 to a ground observer, but may be formed of a symmetrical airfoil, flat bottom airfoil or a semi-symmetrical airfoil. In addition to the airfoil shapes, the shape, including the cross-sectional configuration of the transparent, or substantially transparent, control surface may be formed to minimize, or significantly reduce, the likelihood of reflecting or otherwise directing sunlight (or another source of illumination) to a ground observer. For example, the cross-section of the control surface may be a concave or convex shape to focus or defuse the light. The transparent vertical fin 304 may be fixed, or may have a rotatable control surface portion 306 to facilitate yaw control of the aircraft.

FIG. 4 is a perspective view of the fuselage boom first illustrated in FIGS. 1-3, and having a ruddervator 400 tail arrangement (alternately known as a V-tail). The ruddervator 400 is coupled to the fuselage boom 102 adjacent the servo compartment 200 and may incorporate fully-independent and full-flying control surfaces (as shown) or incorporate partial control surfaces 402 (hinge points illustrated with dashed lines) for control of pitch and yaw moments for the aircraft. Each of the two ruddervator 400 control surfaces may be driven by a direct drive servo (not shown) housed in the servo compartment 200 and may preferably be generally rectangular in shape and formed of a flat-plate airfoil of transparent plastic such as of polycarbonate.

FIGS. 5A and 5B illustrate assembly steps for assembling the transparent stabilizer for later attachment to the fuselage boom as illustrated in FIGS. 1 and 2. A vertical-fin attachment clip 500 formed of nylon, plastic or other rigid material and having receiving means, such as a rod channel 502, may be coupled to a vertical portion of a cut-out base portion 504 of the transparent vertical fin 106. The rod channel 502 may be sized to rotatably receive a rigid hinge pin (see FIG. 6) about which the transparent vertical fin may rotate during operation to provide yaw control of the aircraft. During assembly of the fuselage boom illustrated in FIGS. 1 and 2, the transparent vertical fin 106 may be positioned to detachably attach, or "snap" the rod channel 502 onto the rigid hinge pin (see FIG. 6) to rotatably couple the transparent vertical fin 106 to the aircraft. Another hinge assembly may be provided about which the transparent vertical fin 106 rotates with respect to the wing to provide yaw control. A servo horn 506 having a servo horn channel 508 may be coupled to a horizontal portion of the cut-out base portion 504 of the transparent vertical fin 106 to slidably receive the control arm of a direct-drive servo. The transparent vertical fin 106 is then rotated about the rigid pin to detachably attach, or "snap" the servo horn channel 508 of the servo horn 506 onto the control arm of the direct-drive servo.

Similarly, a stabilizer attachment clip 510 may be coupled to a center cutout region 512 of the horizontal stabilizer 104, with the stabilizer attachment clip 510 having a rod channel 514 to rotatably receive a hinge (see FIG. 6). Two servo horn sliders 516 (or simply "servo horns") may preferably be coupled to opposing sides of the center cutout region 512 to receive respective control arms of direct-drive servos when installed on the aircraft. During assembly, the rod channel 514 may be positioned to detachably attach, or "snap" onto the hinge (see FIG. 6). The horizontal stabilizer 104 may then be rotated about the hinge to detachably attach, or "snap" the two servo horns 516 onto respective control arms of the direct-drive servos. In an alternative embodiment, the attachment clips are omitted and the hinge (see FIG. 6) is received in a channel formed in the horizontal stabilizer 104. Another hinge assembly may be provided about which the horizontal stabilizer 104 rotates with respect to the aircraft to provide pitch control. Similarly, the servo horn sliders 516 may be omitted and a channel or other structure may be provided on the horizontal stabilizer 104, such as a pushrod horn (not shown), in order to receive a rotational moment of the horizontal stabilizer 104 about a horizontal stabilizer hinge may be used.

FIG. 6 is an exploded perspective view of the transparent stabilizer assembled in FIGS. 1, 5A, and 5B. The fuselage boom 102 has a hinge pin 600 that may be rotatably received in the rod channel 502 of the vertical-fin attachment clip 500 to provide a rotational axis for the transparent vertical fin 106. The servo horn channel 508 of the servo horn slider 506 slidably receives and detachably couples to the servo arm 602 for rotational control of the transparent vertical fin 106 about the hinge pin 600 while also providing a means for the transparent vertical fin 106 to rotatably break free from the servo arm 602 if excessive rotational moment is applied to the transparent fin 106 about the hinge pin 600. Calibration lines 604 are preferably provided on the top of the servo compartment 200 and disposed underneath a rotational travel path of the transparent vertical stabilizer 106 to assist calibration of trim for the transparent vertical fin 106 and fuselage boom 102 assembly in preparation for operation. For example, after assembly of the transparent vertical fin 106 onto the hinge pin 600 and servo arm 602, visual comparison of the leading edge 606 of the transparent vertical fin 106 with the known location of the calibration lines 604 would facilitate calibration of trim for the vertical fin. In one embodiment, calibration electronics and memory are located in an interior portion at the proximal end 110 of the fuselage boom 102 to store calibration information for the fuselage boom 102, transparent horizontal stabilizer 104, and transparent vertical fin assembly 106. In an alternative embodiment, calibration lines 604 may be provided at a different location on the servo compartment 200, such as on the rear of the servo compartment for comparison to a trailing edge 608 of the transparent vertical fin 106. Electrical connection to a remainder of the aircraft may be provided through an electrical connector, such as a 4-pin connector 610 (see FIG. 8).

Figure 7:
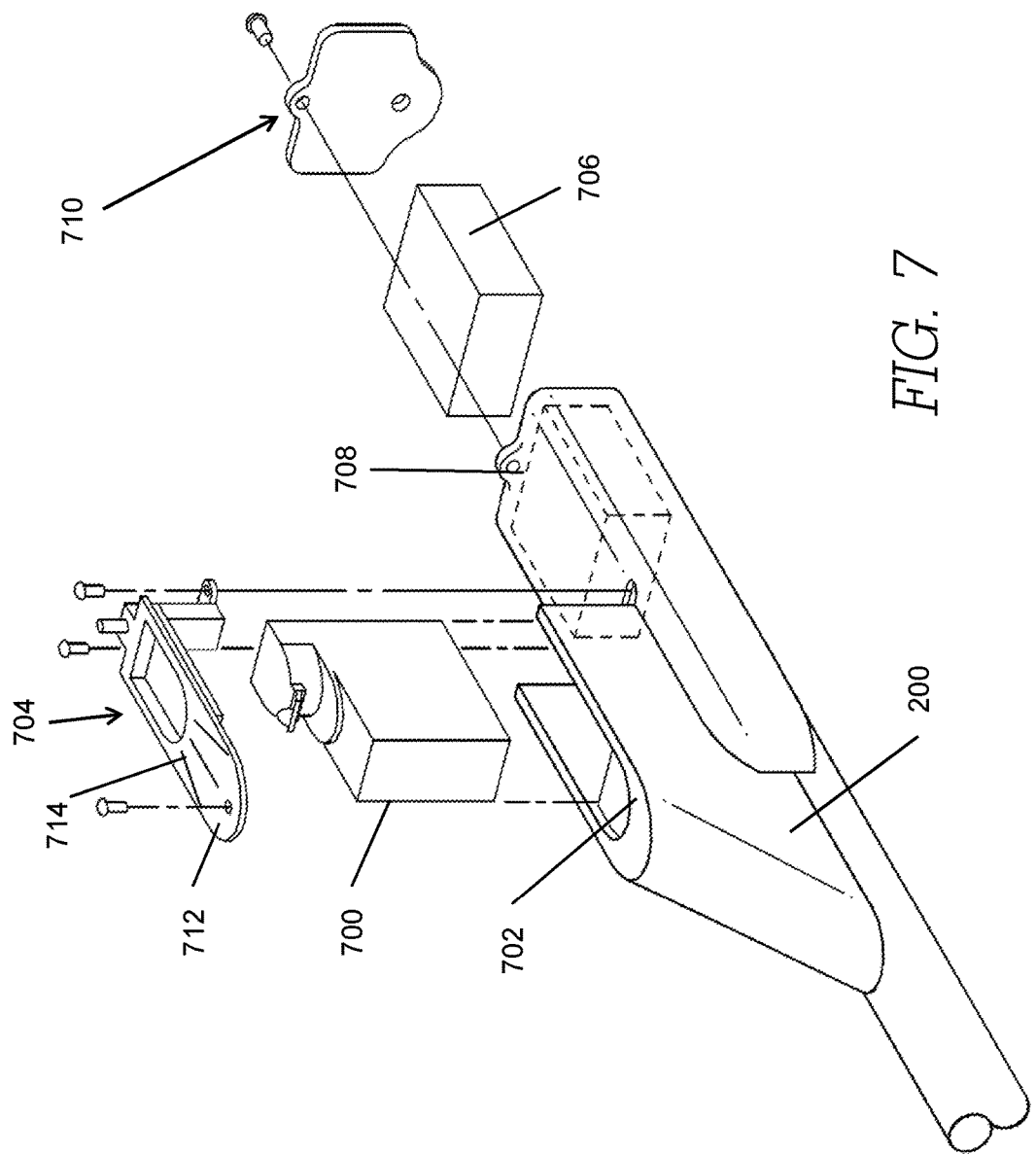
FIG. 7 is an exploded perspective view of one embodiment of a servo configuration in a servo compartment in the distal end of the fuselage boom.

FIG. 7 is an exploded perspective view of the servo compartment 200, associated servos and calibration lines. Rudder servo 700 is slidably inserted and seated in a rudder servo channel 702, and is preferably fixed and held in place by a rudder mount and servo bracket 704 to simplify removal and replacement of the rudder servo 700. If the rudder servo 700 is provided with an external bracket mount (not shown), the servo may be fixedly coupled within the servo channel with screws, adhesive or by other means to a complementary bracket mount in the servo channel or to the walls of the servo channel itself. An elevator servo 706 is slidably inserted into a horizontal elevator servo channel 708 and is preferably held in place in the channel by an elevator mount and servo bracket 710 coupled to the end of the elevator servo channel 708 to simplify removal and replacement of the elevator servo 706. Although the servo compartment 200 is illustrated having a discrete rudder servo channel 702 and elevator servo channel 708, in an alternative embodiment, the servo compartment 200 may provide for coupling of respective servos to rails in the servo compartment or to interior surfaces of the servo compartment 200, itself, rather than restraint of the rudder servo 700 and elevator servo 706 by the rudder mount and servo bracket 704 and elevator mount and servo bracket 710, respectively. In one implementation of a transparent stabilizer in the form of a ruddervator, a single ruddervator servo may be used in the servo compartment 200 to drive the ruddervator. The rudder mount and servo bracket 704 has calibration lines 714 on its surface. Also the calibration lines 714 may be formed on the exterior upper surface of the fuselage boom 200, itself.

During operation and after assembly of the fuselage boom to the remainder of the aircraft system, the rudder servo 700 may be actuated to bring the transparent vertical fin (FIGS. 1-3) to a calibration line, for example, a center calibration line 714 on the rudder mount and servo bracket 704. The rudder servo 700 position may then be stored in a memory (see FIG. 8) for later retrieval to facilitate calibration of the control surfaces.

Figure 8:
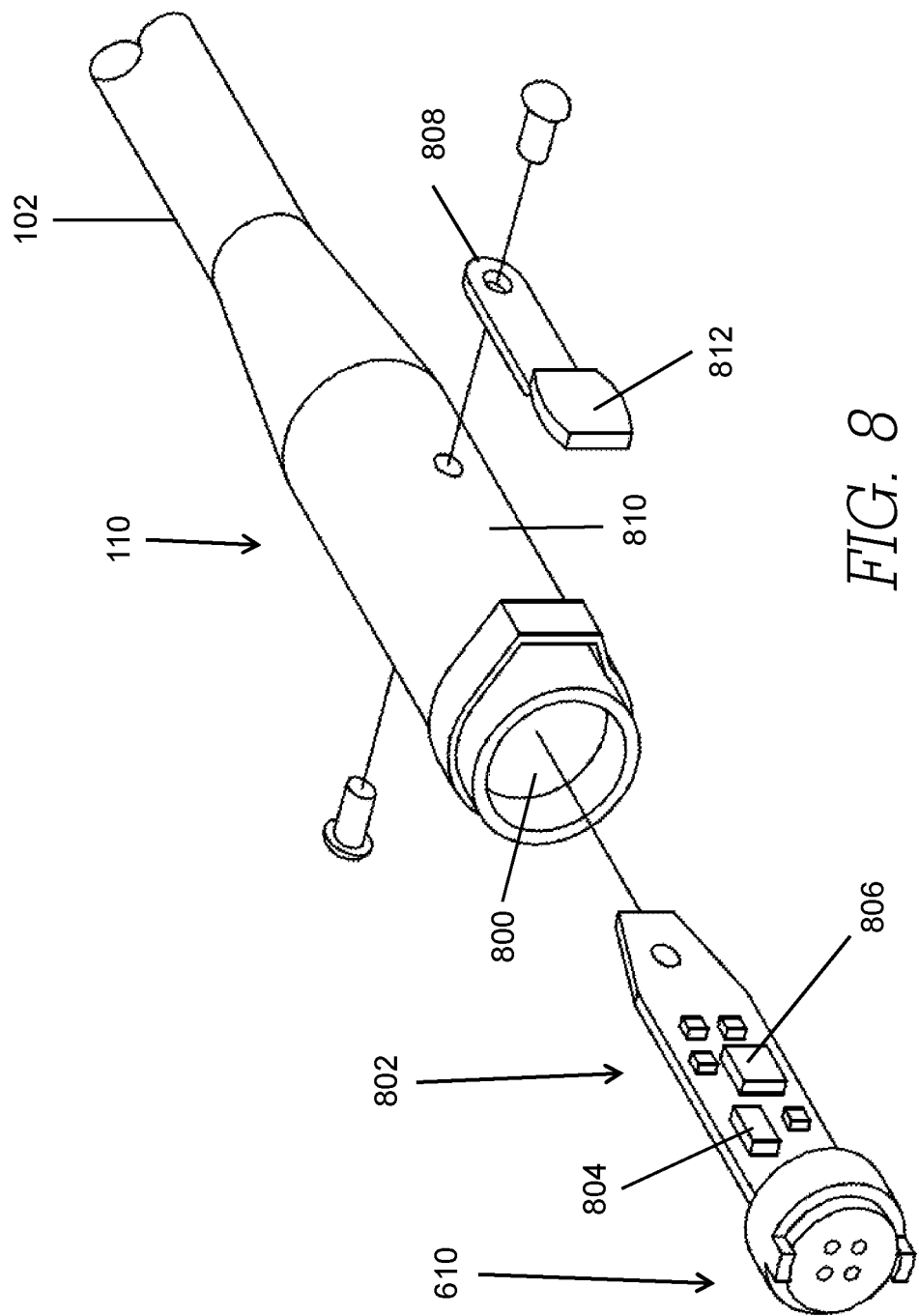
FIG. 8 is an exploded perspective view of one embodiment of a proximal end of the fuselage boom that has internal space for memory and alignment electronics to assist calibration of a transparent stabilizer.

FIG. 8 is an exploded perspective view of the proximal end 110 of the fuselage boom 105 that has memory and alignment electronics to assist calibration of trim for an associated transparent stabilizer (see FIGS. 1-4). An interior portion 800 of the proximal end 110 is sized to accept a tail board 802 that has the 4-pin connector 610 electrically connected to a memory 804 and a controller 806 to collectively provide storage of calibration information associated with transparent tail control surfaces, such as those illustrated in FIGS. 1-4. An attachment clip 808 is coupled to an exterior side 810 of the fuselage boom 102, with a tab portion 812 of the attachment clip 808 extending out beyond an open end of the proximal end 110 to facilitate later attachment of the fuselage boom 102 to the wing center section (see FIGS. 9A and 9B). The tail board 802 is inserted into the interior portion 800 of the proximal end 110 of the fuselage boom 102, with the tail board 802 secured to the interior portion 800 using a pair of screws driven through the exterior side 810 of the fuselage boom 102 and into the tail board 802.

Figure 9:
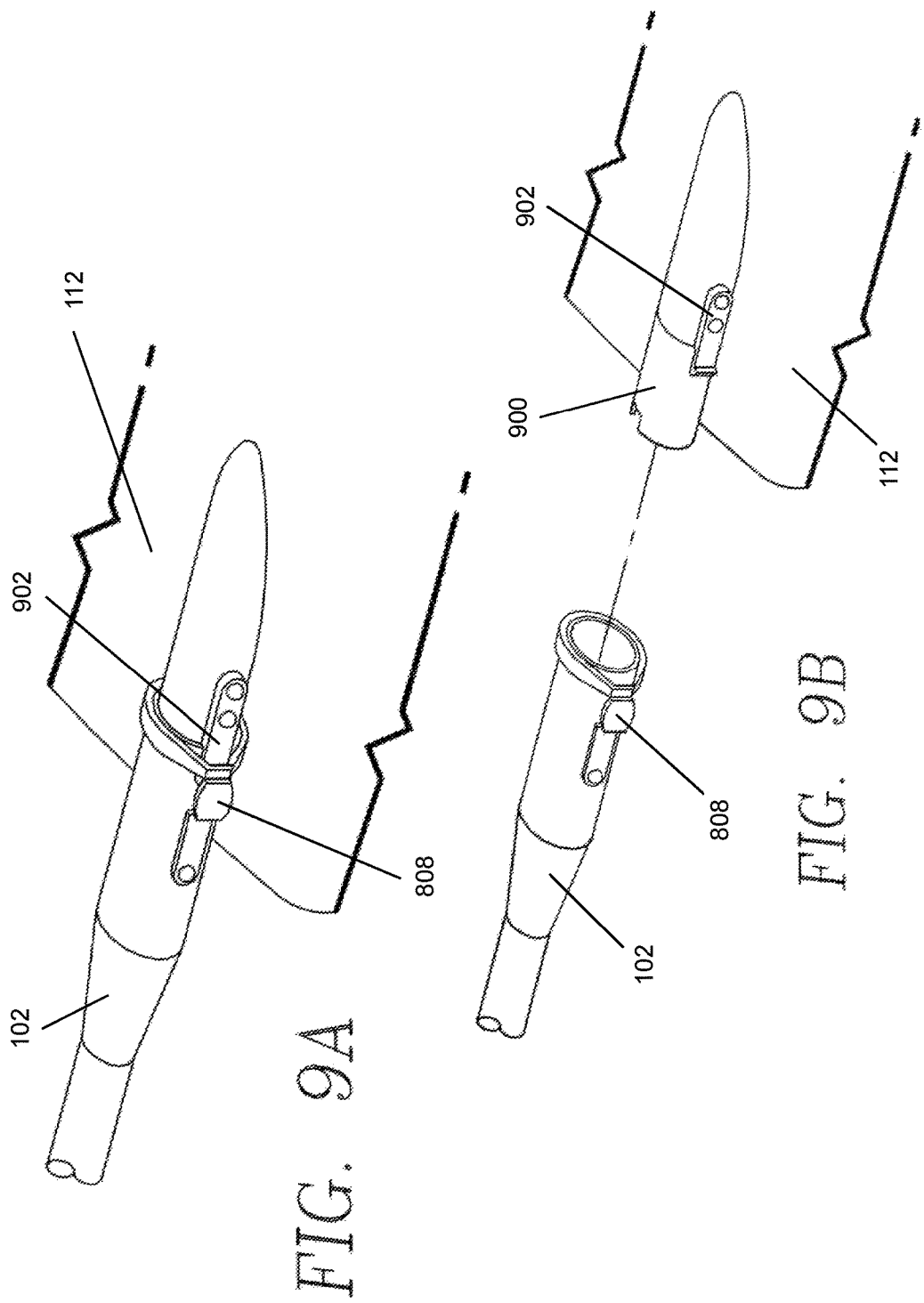
FIGS. 9A and 9B are exploded perspective views illustrating assembly steps for mating the fuselage boom to a wing center section.

FIGS. 9A and 9B illustrate assembly steps made to attach the fuselage boom 102 to the center wing section 112. The fuselage boom is aligned with a center section boom socket 900 and slipped together, with the attachment clip 808 aligned with and detachably coupled to a complementary center section boom clip 902 to retain the fuselage boom onto the wing center section 112.

Figure 10:
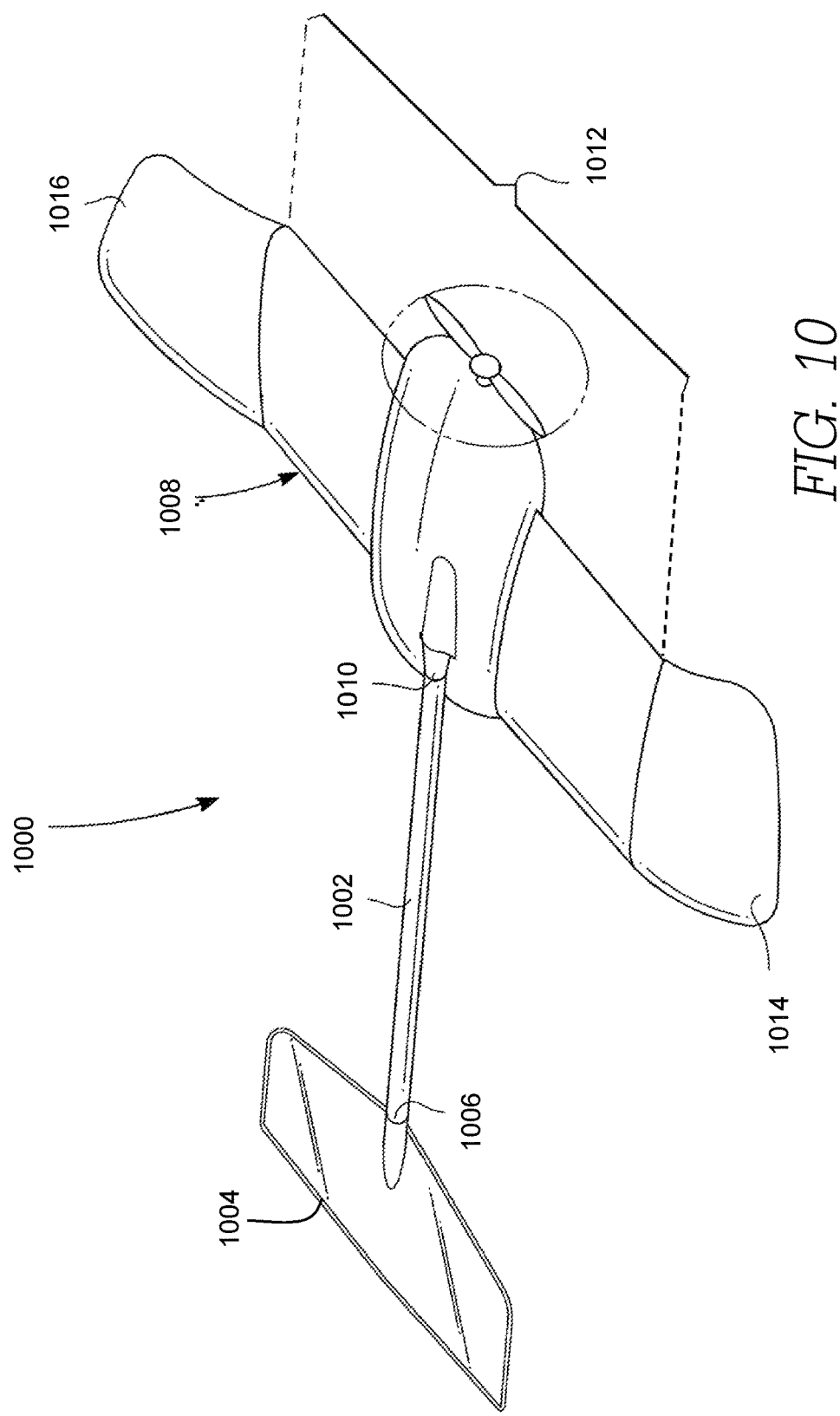
FIG. 10 is a perspective view of one embodiment of an aircraft system that has a transparent canard stabilizer.

FIG. 10 is a perspective view of another embodiment of an aircraft system having a transparent stabilizer 1004 coupled to a wing through a fuselage boom 1002, with the transparent stabilizer 1004 coupled to a front of the aircraft 1000 to define canards. The aircraft 1000 may have a tubular fuselage boom 1002 that has a transparent horizontal stabilizer 1004 coupled to its distal end 1006. The fuselage boom 1002 couples to and extends from a wing 1008 at a proximal end 1010 of the fuselage boom. The wing may be defined by a center section 1012, port outboard wing section 1014, and starboard outboard wing section 1016 that each have curved leading and trailing edges of varying radii from what may otherwise be a typical linear aircraft sweep line to reduce recognition of the aircraft from the ground.

Figure 11B:
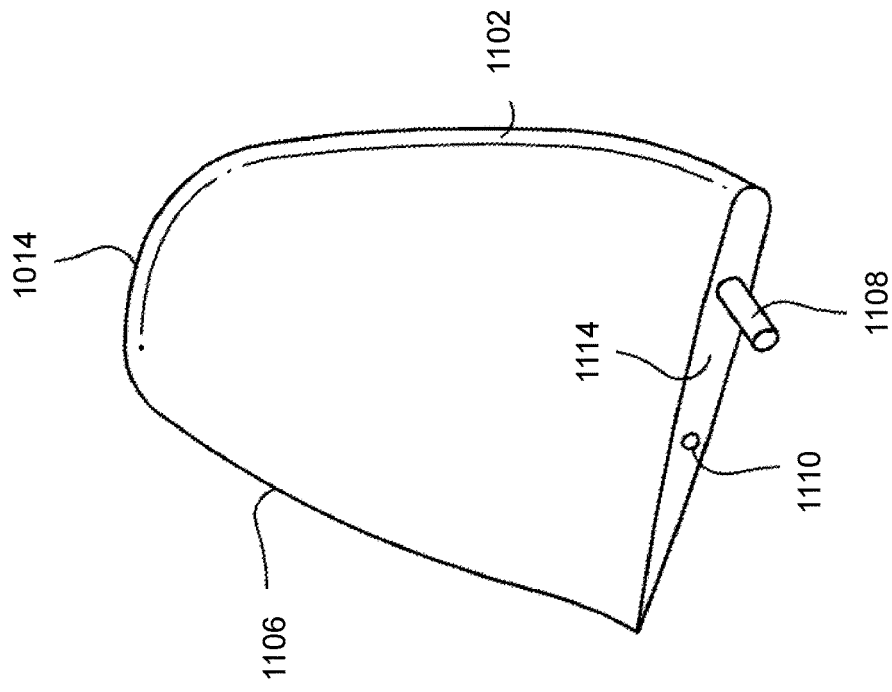
FIGS. 11A and 11B are perspective views of, in one embodiment, outboard port and outboard starboard wing sections having leading and trailing edges of varying radii.
Figure 11A:
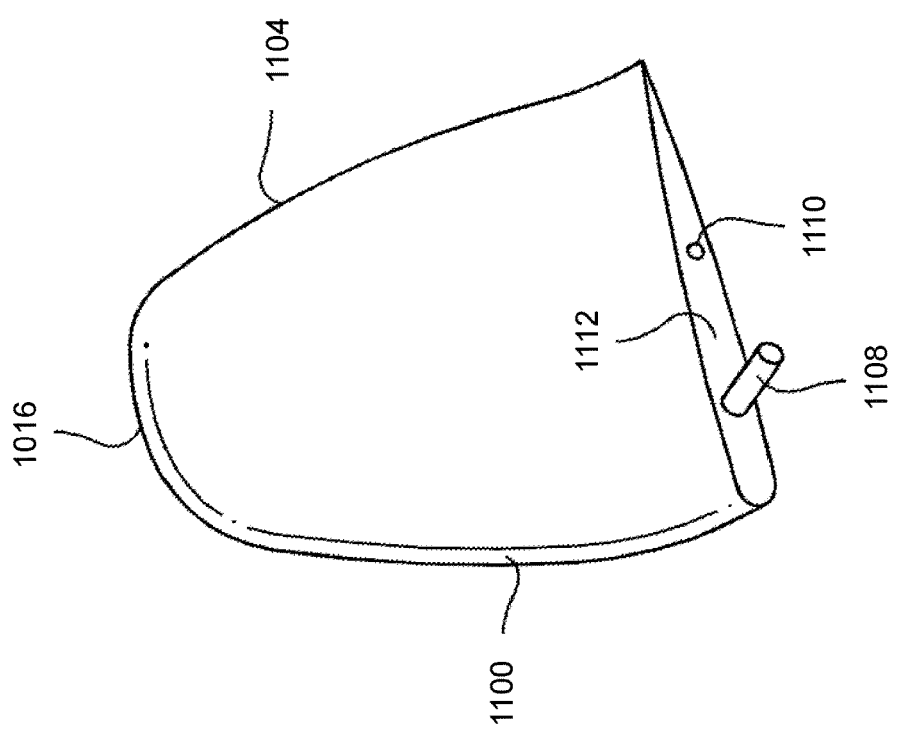

FIGS. 11A and 11B are perspective views of starboard outboard wing section 1016 and port outboard wing section 1014, respectively. Starboard outboard wing section 1016 may have a leading edge 1100 that has a low visual signature organic shape, such as a line of varying radii, rather than a straight-line leading edge. The port outboard wing section 1014 also may have a leading edge 1102 that has a low visual signature organic shape, such as a line of varying radii. In other embodiments, the wing leading edges may be formed of a combination of varying radii portions and straight portions, or varying radii portions and portions having a constant radii path. Similarly, each of the starboard outboard wing section 1016 and port outboard wing section 1014 has a starboard trailing edge 1104 and a port trailing edge 1106 that have a low visual signature organic shape, such as a line of varying radii. Each of the starboard outboard wing section 1016 and port outboard wing section 1014 may have a coupler system such as a pin adapter 1108 and a ball adapter 1110 protruding from respective inner starboard root section 1112 and inner port root section 1114 to detachably couple the starboard outboard wing section 1016 and port outboard wing section 1014 to complementary sockets in the center section of the wing (see FIG. 12). Each of the starboard wing section 1016 and port outboard wing section 1014 may be formed having a transparent covering material or may be formed of transparent materials.

Figure 12:
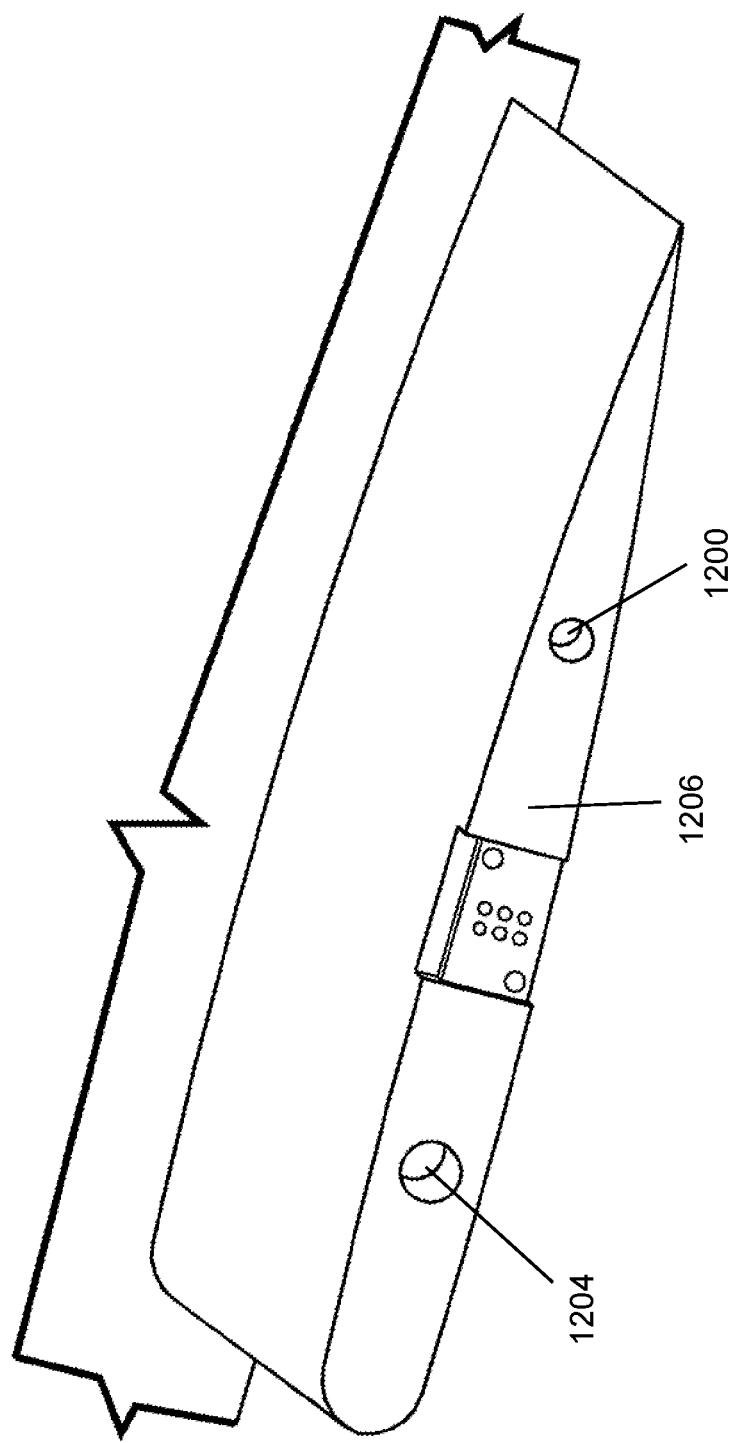
FIG. 12 is a side perspective view of female connectors used to couple the outboard port wing section to a wing center section.

FIG. 12 is a perspective view of a center section port wing root that illustrates the pin adapter socket 1200 and ball female socket 1204 for attaching the port outboard wing section to the center wing section. A pin adapter socket 1200 and ball socket 1204 are spaced apart and seated in a center section port wing root 1206 to receive the pin adapter 1108 and ball adapter 1110 illustrated in FIG. 11. An electronics connection 1208 may allow for direct communications with the electronics of the vehicle. For example, the electronics connection 1208 may be used to upload a mission profile or other instructions. The electronics connection 1208 is protected during use by the covering of the port outboard wing section 1014 (see FIG. 11B).

Figure 13A:
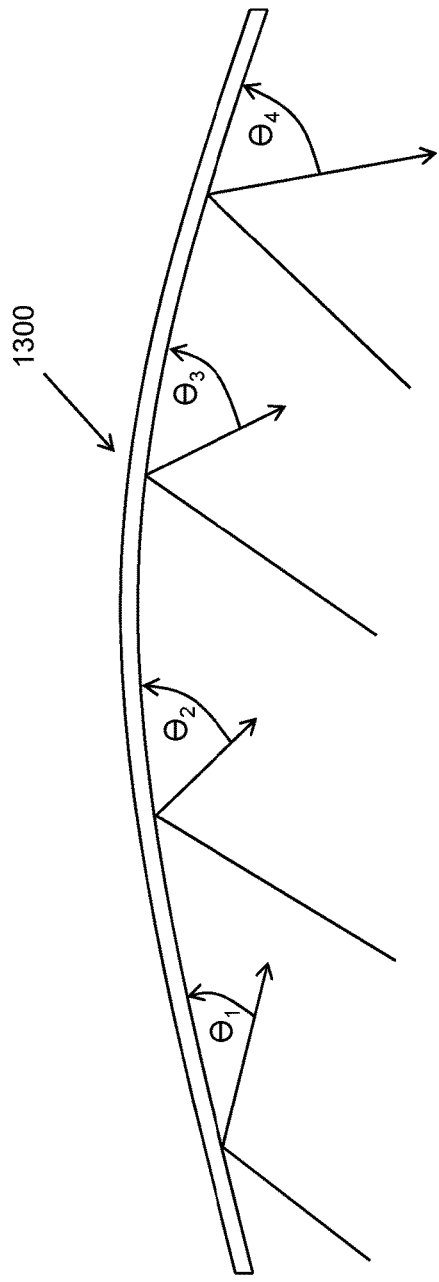
FIGS. 13A and 13B are cross sectional views of concave and convex stabilizers, respectively, to focus and diffuse light, respectively.
Figure 13B:
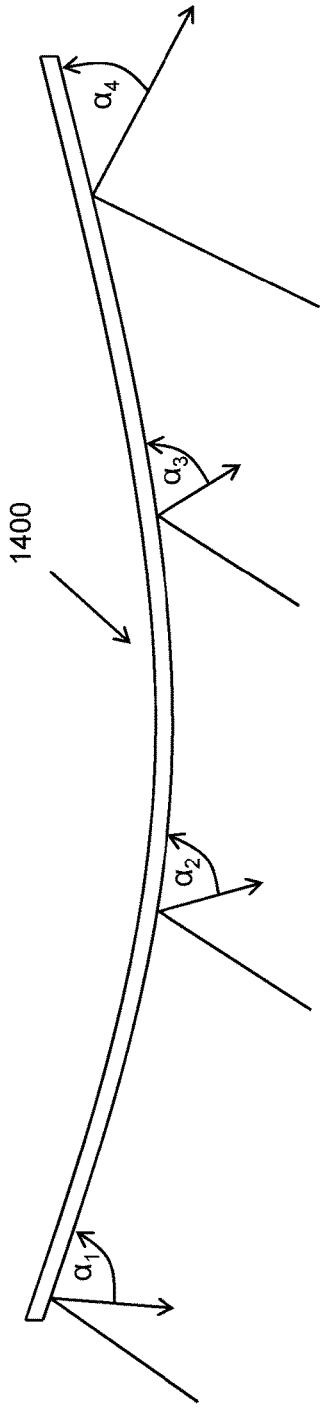

FIGS. 13A and 13B illustrate two alternative embodiments of a non-planar transparent stabilizer configured to reduce the likelihood of an aircraft system being seen by those in an observation area. Given a columnar light source illuminating the concave transparent stabilizer 1300 and convex transparent stabilizer 1400 the angle of incidence and light reflection at each point along the stabilizer surfaces are different. For example, the concave stabilizer 1300 may have an angle of incidence and reflection for a given incoming beam at angles $\Theta_1, \Theta_4$, where $\Theta_1 < \Theta_2 < \ldots \Theta_4$. The convex stabilizer 1400 may have an angle of incidence and reflection for a given incoming beam at angles $\alpha_1, \alpha_2, \ldots \alpha_4$, where $\alpha_1 > \alpha_2 > \ldots \alpha_4$. By providing a non-linear surface, the intensity of light received by a ground observer is reduced from what may otherwise exist from a planar transparent stabilizer reflecting the columnar light source at such an observation location.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. It is contemplated that various combinations and/or sub-combinations of the specific features, systems, methods, and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. An aircraft apparatus, comprising:
   a boom;
   a stabilizer coupled to said boom;
   a servo housed in said boom, said servo having a servo arm; and
   a servo horn slidably coupled to said stabilizer to slidably receive and detachably couple said servo arm to said stabilizer.

2. The aircraft apparatus of claim 1, wherein said boom is a fuselage boom having proximal and distal ends.

3. The aircraft apparatus of claim 2, wherein said stabilizer is coupled to said distal end of said fuselage boom, wherein said servo is housed in said distal end of said fuselage boom, and wherein a wing is coupled to said proximal end of said fuselage boom.

4. The aircraft apparatus of claim 1, wherein said stabilizer is a transparent stabilizer.

5. The aircraft apparatus of claim 1, wherein said stabilizer is a horizontal stabilizer.

6. The aircraft apparatus of claim 5, further comprising:
   a vertical stabilizer positioned proximate to said horizontal stabilizer;
   a rigid pin extending from said boom; and
   an attachment clip coupled to said vertical stabilizer, said attachment clip having a channel to receive said rigid pin;
   wherein said vertical stabilizer is rotatable about said rigid pin.

7. The aircraft apparatus of claim 1, wherein said stabilizer is a vertical fin.

8. The aircraft apparatus of claim 1, further comprising:
   a plurality of calibration lines marked on an exterior surface of said boom and adjacent to said stabilizer to provide calibration marks for said stabilizer.

9. The aircraft apparatus of claim 1, wherein said stabilizer comprises a flat-plate airfoil.

10. The aircraft apparatus of claim 1, wherein said stabilizer consists of clear polycarbonate plastic.

11. The aircraft apparatus of claim 1, wherein
   said boom is a fuselage boom having proximal and distal ends; and
   said stabilizer is a transparent stabilizer coupled to said distal end of said fuselage boom, wherein said transparent stabilizer reduces an observer visibility of said aircraft apparatus in an observation area during a flight of said aircraft apparatus.

12. The aircraft apparatus of claim 11, wherein said fuselage boom is tubular to reduce said observer visibility of said aircraft apparatus in said observation area during said flight of said aircraft apparatus.

13. The aircraft apparatus of claim 1, wherein said boom is a fuselage boom having proximal and distal ends, and wherein said stabilizer is coupled to said distal end of said fuselage boom.

14. The aircraft apparatus of claim 13, further comprising:
   a wing coupled to said proximal end of said fuselage boom.

15. The aircraft apparatus of claim 14, wherein said wing comprises:
   a center section; and
   a port outboard wing section and a starboard outboard wing section, each of said port and starboard outboard wing sections detachably connectable to said center section and each having curved leading and trailing edges of varying radii.

16. The aircraft apparatus of claim 11, wherein said transparent stabilizer is a horizontal stabilizer.

17. The aircraft apparatus of claim 16, further comprising:
   a vertical stabilizer positioned proximate to said horizontal stabilizer;
   a rigid pin extending from said fuselage boom; and
   an attachment clip coupled to said vertical stabilizer, said attachment clip having a channel to receive said rigid pin;
   wherein said vertical stabilizer is rotatable about said rigid pin.

18. The aircraft apparatus of claim 11, wherein said transparent stabilizer is a vertical fin.

19. The aircraft apparatus of claim 11, wherein said transparent stabilizer comprises a flat-plate airfoil.

20. The aircraft apparatus of claim 11, wherein said transparent stabilizer consists of clear polycarbonate plastic.

* * * * *